UNITED STATES PATENT OFFICE.

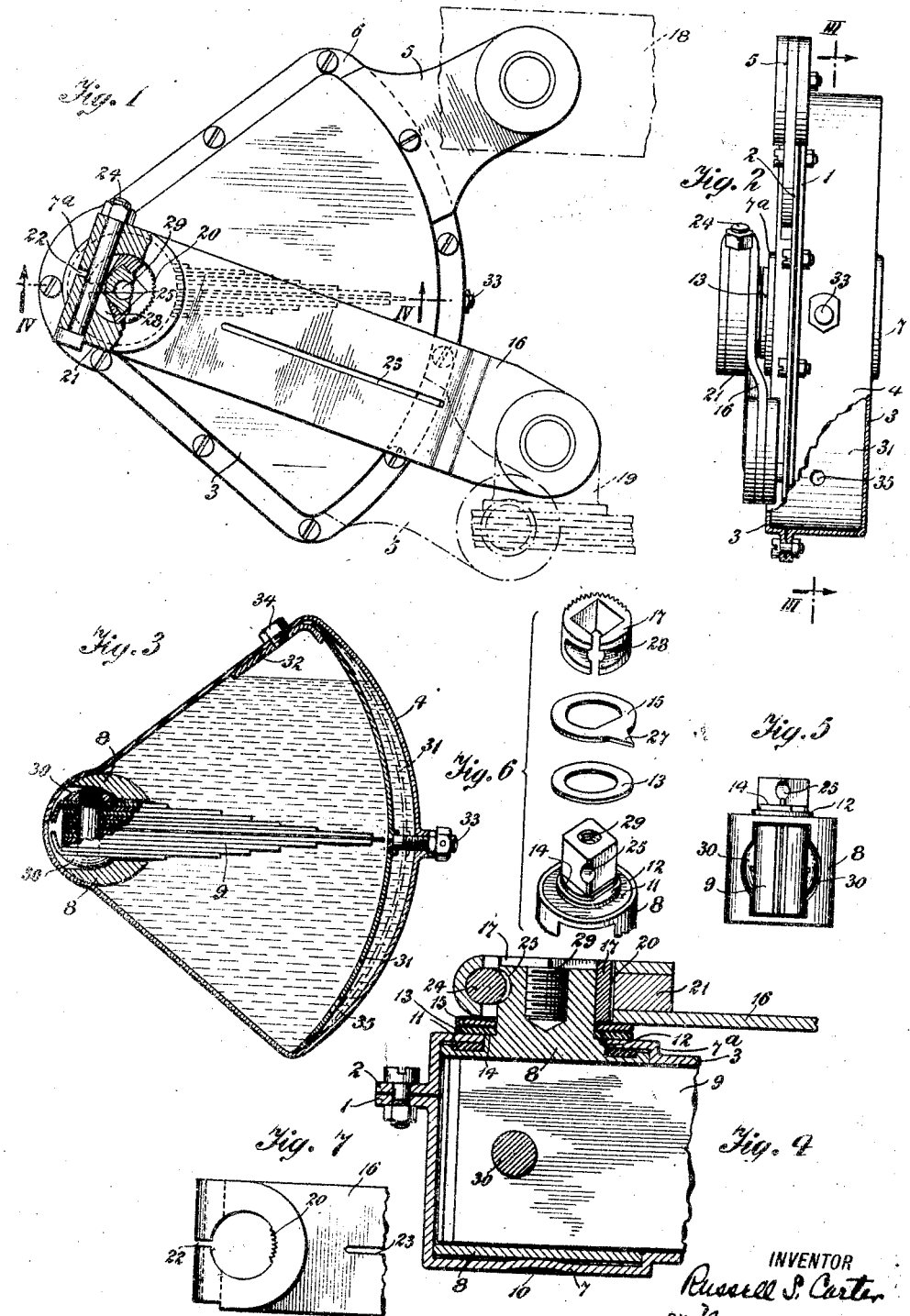

RUSSELL S. CARTER, OF HEWLETT, NEW YORK.

SHOCK-ABSORBER.

1,318,051.   Specification of Letters Patent.   Patented Oct. 7, 1919.

Application filed February 4, 1916. Serial No. 76,103.

*To all whom it may concern:*

Be it known that I, RUSSELL S. CARTER, a citizen of the United States, residing at Hewlett, in the county of Nassau and State of New York, have invented the following described Improvements in Shock-Absorbers.

The invention is an improvement in that kind of shock absorbing mechanism which utilizes the combined resistance of a confined liquid and a spring-yielding means to suppress and control the shock motions between the spring-connected parts of automobiles or other vehicles, being an improvement upon the shock absorbing mechanism disclosed in my Patent No. 1171169, dated February 8, 1916. Among other things the invention consists in providing the liquid-confining chamber with an elastic chamber wall having a large area exposed to the liquid whereby it is capable of temporarily absorbing and storing a substantial part of the impact energy of the shock while also controlling the size of the flow passage around the piston, and as applied to the shock absorber of the aforesaid application, it consists in supplementing the energy-storing functions of the spring yielding member, therein described, by a further energy-absorbing spring contained in or forming part of the casing of the device. Superior results are attained by combining liquid resistance with spring resistances of graded degrees of strength or stiffness and preferably so arranged that both or all of them coöperate in controlling the size of the liquid-flow passage around the piston, one yielding to the liquid pressure more readily than the other, but both serving to store the shock energy in appreciable amount and thereby producing a live-resistance retarding effect as distinguished from the dead resistance effects of ordinary liquid dashpots. The principles of the invention and the preferred means of applying the same, will be more readily understood by reference to the accompanying drawings, wherein—

Figure 1 is a side elevation of the improved shock absorber with the hub arm connection broken away and in section.

Fig. 2 is an end elevation of Fig. 1, partly broken away.

Fig. 3 a cross-section of Fig. 2, on line III—III.

Fig. 4 a larger scale partial section through the hub axis on line IV—IV of Fig. 1.

Fig. 5 is a rear elevation of the hub, on the same scale as Fig. 3.

Fig. 6 is an assemblage perspective view of the hub packing and arm connection, and Fig. 7 is a detail of the hub arm.

In the example shown by these figures, the casing constituting the liquid-confining chamber is of general sector shape and made of sheet metal in a body part and a cover part, each of which is of such dimensions that it can be pressed to finished shape from flat sheet-metal stock, and hence be economically produced. The two parts of the chamber are joined by bolting their respective flanges 1 and 2 together and upon an interposed gasket. The opposite side walls 3 of the chamber are substantially flat and parallel and adapted to yield under the pressure of the liquid, as presently explained, but the peripheral or sector-shaped body wall 4 is relatively stiff by reason of its reinforcement by the bolt-flanges 1 and 2, which for this purpose are disposed within the planes of the side walls 3 as indicated (Fig. 2). A connection arm 5 is secured to the casing by its curved and widened edge 6, which is spot-welded to the cover flange 1 and also bolted thereto by one of the flange bolts which unite the sections. This connection arm is made separately from the chamber and attached to it, for the reason, first, that it may be attached either to the upper or the lower part of the casing (as indicated by dotted lines in Fig. 1), and thus adapting the device to serve as a right-hand or left-hand absorber, as desired; and, second, for the simplification of manufacture and obvious economy of material. At the hub part of the casing, the sheet metal side walls 3 are bossed outwardly, forming end seats 7 and 7ª for the hub 8 of the piston 9. The seat 7 in the body part of the casing is initially dished inwardly and provided with a central teat 10 so that when the hub is in place, the teat engages resiliently its flat end, about as shown in Fig. 4. The hub seat 7ª in the cover member is centrally perforated to accommodate the reduced end of the hub which projects to the exterior of the casing for connection to the hub arm and the margin of the perforation is similarly initially dished inward so that it may also bear resiliently upon the end of the hub when the body and cover parts have been clamped together by the bolts. The said margin bears preferably against the surface of a packing washer 11 countersunk in the end of the hub and its edge sets against the cylindrical surface of the hub shoulder 12 and beneath an outside packing washer 13 which overlies it and also the shoulder 12. The outside washer 13 is fitted around a still smaller shoulder 14, and clamped in place by a dished spring washer 15, so that the inner edge of the seat boss 7$^a$ is thus resiliently clamped between two packing washers producing an effective leaktight joint between the hub and casing, which is self-compensating for wear by reason of the spring pressure, and it will be observed that the joint is also sealed in very compact form, that is to say by means which permit the hub-arm 16 to be secured to the hub at a minimum distance from the casing wall, which thus adapts the device as a whole to be connected to the automobile in positions that might not be available for a bulkier construction. The end of the hub beyond the washer-shoulder 14 is squared or otherwise angularly shaped for attachment to the hub arm 16 which is provided with a connection bushing 17 adapting it to be attached to the hub in different angular relations.

It will be understood that the two connection arms 5 and 16, are intended to be pivotally connected, respectively, to the spring-connected parts of the automobile, sa for instance to the chassis frame indicated at 18, and the spring or spring shackle 19, the provision for changing the angular relation of the hub and hub arm being to adapt the device for connection to vehicles having different normal separation of the said parts and retain at the same time a desired normal or mid position of the piston. For this purpose the split bushing 17 is fitted to the square hub and peripherally serrated to engage and interlock with corresponding serrations 20 in the hole of the arm (Fig. 7). The said arm 16 is formed of sheet metal folded over on itself and against an interposed filler block 21 to which it is welded, the bushing hole with the serrations 20 being formed in the thickened end thus produced. The bushing hole is also split as indicated at 22 so that the arm may be contracted edgewise to clamp around the bushing. The split may be punched in the sheet metal arm when it is blanked out, and when the slot 23 is formed therein prior to its folding, if desired. The hole for the clamp bolt 24 is provided by the open space left between the end of the filler block 21 and the curve of the bent over part. When the bushing has been placed on the squared end of the hub and against the spring washer 15 thereon, the hub arm may be interlocked on the bushing at the desired angle to the hub and then the hub and its bushing are forced against the washer putting it and the packing washers 11 and 13 under compression, whereupon the clamp bolt 24 is tightened, which not only binds the arm on the bushing, but also binds the bushing on the squared hub and thus locks all the parts in that relation. The end of the hub is drilled and tapped at 29 to permit a wide-headed screw to be used to force the arm home and put the packing washers under compression, such screw or tool being subsequently removed. The clamp bolt 24 is so located as to occupy a notch 25 in the corner of the squared end of the hub when in place, which of course keys the arm thereon against accidental displacement. The desired angular adjustment of the arm and hub is determined in practice by observing the position of the pointer 27 on the washer 15 with reference to some index mark on the casing (not shown) the said washer being formed to surround the small shoulder 14, which it fits, only in one position. The clamp bolt is accommodated to the different possible positions of the bushing in the arm, by milling the groove 28 therein so that it bends around the squared hub end, as shown in Fig. 1, thus allowing the bolt 24 to key with the bushing and the hub in various different angles as will be evident.

The piston member 9 is mounted within the chamber in a diametral slot in the hub and with sufficient looseness to provide a lost angular motion of about four degrees, thereby adapting the hub to oscillate through an angle of such extent without imparting movement to the piston. The piston is the primary spring-yielding member of the device and consists of a series of spring leaves of graded length and flush edges, and all of them being clamped together and constituting a spring approximating the strength of the vehicle spring. The piston slot is also somewhat longer in the direction of the hub axis than the width of the piston, so that the latter may thus center itself between the side walls 3 and thus avoid wear on either of them, the width of the piston b ing substantially that of the interior of the liquid chamber.

The preferred form of piston mounting is illustrated in Figs. 3 and 5. The ends of the bolt or rivet 30 which unites the spring leaves, are rounded, and the piston slot is also similarly rounded, but on a slightly larger radius, thus producing a limited ball and socket joint which is adequate to retain the piston in place while in action, but permits it to be slipped out of the hub when the latter is removed. The piston is thus held in the hub by its relation to the other parts, no special appliances being necessary to this end.

The arcuate end wall of the sector-shaped casing is faced with an elastic false wall 31 of the full width of the chamber and held in place by a lug 32 spot-welded to the interior of the body part of the casing and by an adjusting screw 33 threaded in the curved end wall 4 at about its center and projecting to the exterior of said wall where it is subject to manipulation for adjustment in any convenient manner. This wall 31 is coextensive in length with the normal stroke of the piston, and preferably with the maximum stroke thereof, and is formed of spring steel of considerable stiffness being free to flex centrally outward, away from the piston but not to approach the piston further than allowed by the adjustment of the screw 33. It may be introduced into the chamber without previous curvature so that its tendency is always to return to a straight position. The casing is filled more or less completely with a liquid resistance medium, castor oil being suitable, through the filler plug 34 and is thereupon ready for use as soon as the piston member has been adjusted to mid-position for normal vehicle loads, as above explained, and the adjusting screw has been set to accommodate the value of such load. It will be evident that for minor vibrations of the vehicle springs, the piston hub will rotate freely in the casing without encountering resistance since, because of the lost motion connection, the piston is not moved by minor vibrations of the hub. On vibrations of larger magnitude however the piston will be moved in one direction or the other, and will impart to the liquid in front of it a degree of pressure corresponding in a general way to the suddenness with which the vibration was experienced. The result of such pressure flexes one or both of the spring yielding members, opening up a flow passage around the free end of the oscillating piston. The elastic chamber wall is preferably of a less degree of strength than the spring piston and consequently yields the more readily, but such yielding is dependent upon the escape of liquid behind it, and for this purpose a vent hole 35 is provided at one of its ends and preferably such hole is disposed at that end of the chamber which the piston approaches in its movement corresponding to the recoil of the vehicle springs. Upward movement of the piston in Fig. 1 corresponds to the impact of compression movement of the vehicle springs. When the piston is performing its upward or impact stroke, the pressure of the liquid above it flexes the chamber wall outwardly and the liquid behind the wall escapes to the lower side of the piston through the vent hole 35, but on its movement in the opposite direction the pressure of the liquid is communicated through the vent to the outer side of the said chamber wall and consequently little or no yielding of said wall can take place. As the result of this arrangement (which may obviously be varied to suit requirements) the piston member requires greater force to move it through its recoil stroke than through its impact stroke, a condition that is desirable for some types of vehicle springs. The elastic resilience of the chamber wall is at all times available for controlling the flow passage from one side of the piston to the other, since it extends alongside of and parallel with the direction of flow and is subject to displacement to greater or less extent in proportion to the pressure in the liquid, that is to say, for one shock the said wall might yield merely to a mid-position, whereas on a maximum shock it would yield the full extent permitted. The said elastic wall exposes a large area to the pressure of the liquid, substantially equal, when in action, to the active area of the piston, and thereby the effect of its resilience is imparted to the retarding action of the device in substantial degree, aiding materially in producing the live resistance effect above referred to.

It should be noted, moreover, that in the preferred form of this invention as illustrated in the drawings and above described, and by virtue of the pressure communication between opposite sides of the wall 31, the action of the device involves a resistance cycle which is specially useful and desirable in automobiles and similar vehicles, and the combination of shock-absorbing mechanism involving such a cycle, with the spring-connected parts of the automobile, constitutes an important part of my invention, independent of the particular mechanism by which provided. It will be observed that departure from their normal position of the spring-connected parts of the vehicle, corresponding, for example, to the upward movement from its mid-position of the piston 9, encounters a progressively increasing resistance, due to the fact, first, that the piston is much stiffer than the yielding wall 31, and, second, that the area of the latter exposed to the liquid under pressure is constantly diminishing, with the result that the said wall by reason of its elasticity tends to resume its initial position, thereby restricting the capacity of the flow passage around the end of the piston. On the return movement of the vehicle parts corresponding to the downward stroke of the piston 9, the relative immovability of the wall 31 prescribes a constant capacity of the said flow passage to the full end of the stroke in the downward direction (assuming a given force of shock). On the upward movement of the piston to its normal or neutral position, the resistance encountered until the piston reaches and passes the vent 35, is substantially constant and after passing the vent increases through any further upward movement, although it might continue constant or even decreasing, depending upon the relation between the shock pressure and the resilience of the wall 31. After passing the neutral point in the upward direction, however, the resistance encountered will, in any event, be an increasing resistance, due to the eccentricity of the end wall 4, which mechanically limits the outward deflection of the wall 31. Thus, the spring-connected vehicle parts encounter an increasing resistance to the departure from normal position, a substantially constant resistance throughout the whole of the stroke in the opposite direction, and an increasing or substantially constant resistance back to their normal position, this cycle being slightly but favorably modified by the change of effective lever length of the members due to the change of their angularity, and being also independent of the piston's flexure.

It will be apparent also that the opposing flat side walls 3 of the sheet metal casing likewise expose a very considerable area to the pressure of the liquid, and by making these side walls thin enough and of appropriately tough material, they may be caused to supplement the function of the elastic wall 31, it being evident that they may bulge outwardly to a considerable extent without deforming the casing, and that by such bulging they operate to increase the flow passage around the piston, that is to say, around the side edges thereof.

The adjusting screw 33 is provided with an adequate screw-threaded bearing in the end wall of the casing, by punching and bossing the same outwardly and reinforcing if necessary. The hole for the filling plug 34 is also formed through the top of the casing and the lug 32. The latter is welded to the casing adjacent to the connection arm 5, and according to the position of the latter, in right or left hand absorbers, being preferably always at the top so as to serve as reinforcement to the hole for the plug 34, which is at the top. While the shape of the liquid containing chamber is not of the essence of my invention, yet it nevertheless is pertinent to explain that the radial walls thereof are sufficiently sloped from exactly radial position to be encountered first by the tip end of the spring piston, so that the resilience of the latter serves to cushion the shock of engagement if the parts should on emergency ever reach such extreme position and thereby the device and other parts are safeguarded against injury from abnormal conditions.

Claims.

1. A vehicle shock absorber comprising in combination a liquid confining chamber, a yielding piston member therein around which the liquid flows under the effect of the shock pressures, and an elastic chamber wall of relatively large area exposed to the confined liquid and resiliently yielding to different degrees of displacement from its idle position and proportionately to the degree of pressure of said liquid thereon, whereby the said wall resiliently affects the relative movement of the parts.

2. In a shock absorber, a chamber including an elastic wall and adapted for connection to one of the parts between which the shock is to be absorbed, a piston member in said chamber connected to the other part and adapted to oscillate alongside of the said elastic wall, and a body of liquid confined in said chamber and adapted to flex said wall.

3. A shock-absorber comprising a piston mounted on a hub and oscillating within a chamber containing liquid, said chamber having an elastic wall coextensive with the normal stroke of said piston and subject to flexure by the pressure of the liquid thereagainst.

4. A shock-absorber comprising a chamber formed of sector-shaped side walls and containing liquid, an oscillating, hub-mounted spring-yielding piston therein occupying the space between said side walls, an arc-shaped wall opposed to the free end of the piston and normally separated from said piston further at the middle of its stroke than near the end of its stroke, and means for varying the extent of such separation.

5. A shock-absorber comprising a chamber containing liquid, a piston member therein, a passage whereby the liquid may flow from one side to the other of said chamber, an elastic chamber wall constituting a wall for said passage, and adjustment means for flexing said wall to vary said passage.

6. A shock-absorber comprising a chamber containing liquid, a piston therein, an elastic chamber wall constituting a wall of a passage through which the liquid flows from one side to the other of the piston, and adjustment means for flexing said wall away from the piston at about the mid-point of the latter's stroke.

7. In a shock-absorber, a liquid-containing chamber, a hub journaled therein, an oscillating blade on the hub adapted to impart the shock pressure to the liquid, and an elastic chamber wall adjacent the free end of the blade adapted to be moved by the pressure of the liquid and thereby serving to control the flow of the liquid in the chamber.

8. In a shock-absorber, a casing forming a chamber containing liquid, a hub therein, a spring-yielding blade mounted on the hub and adapted to cause the liquid to flow around the flexed end thereof, the mid region of the chamber wall adjacent the said end of the blade being adjustable toward and away from the same.

9. In a shock absorber, the combination of a liquid-confining chamber, a spring-yielding piston member exerting pressure on the liquid, and an elastic chamber wall exposed to the pressure of the liquid, both said member and wall being adapted to temporarily store the shock energy.

10. In a shock absorber, the combination of a liquid-confining chamber, an elastic piston member therein and an elastic chamber wall exposed to the pressure of the liquid, said member and wall possessing different degrees of spring strength and both operating to temporarily store the shock energy.

11. In a shock absorber, the combination of a liquid-confining chamber, a piston movable therein, an elastic chamber wall extending alongside the path of the piston and exposed to the pressure of the liquid therein and supported to have its maximum yield at substantially the mid-point thereof.

12. In a shock absorber, the combination of a liquid-confining casing composed of body and cover parts, one of said parts having a sheet metal side wall subject to expansion, and a spring-yielding piston mounted in said casing and adapted for movement between and parallel with said side wall and adapted to impart pressure to the liquid to expand the same.

13. In a shock absorber, the combination of a liquid-confining chamber, a piston member therein, an elastic wall in said chamber subject to flexure away from the piston by the pressure of the confined liquid, and means controlling the escape of liquid behind said wall and thereby determining the extent or period of its said flexure.

14. In a shock absorber, the combination of a liquid-confining casing, a hub therein, a spring-yielding piston member having lost motion connection with the hub, and an elastic wall in said chamber subject to displacement by the pressure of the liquid therein.

15. A shock absorber comprising a substantially sector-shaped casing formed of pressed sheet metal sections secured together and initially devoid of connection means, a hub-mounted piston having a connection arm secured to its hub, and a sheet-metal connection arm for said casing, formed separately therefrom and having an attachment edge adapted to fit either the upper or lower parts of the arcuate end of said casing and permanently secured to one of said parts, whereby the absorber may be made right or left handed according to the position of said connection arm.

16. The combination with the spring-connected parts of a vehicle, of shock-absorbing mechanism connected therebetween and comprising a liquid-containing chamber, a piston member therein and a variable resistance element moved by and controlling the liquid flow to opposite sides of the piston member and co-acting therewith to oppose increasing resistance to the relative movement of the piston away from its normal or mid-position and a substantially constant resistance throughout its full stroke in the opposite direction.

17. In a shock absorber, the combination of a liquid-confining chamber, a slotted cylindrical hub fitting therein, and an oscillating piston member loosely engaged in the slot in said hub and adapted to impart the shock pressures to the liquid, whereby the latter flows around said piston member.

18. In a shock absorber, the combination of a liquid-confining chamber, a hub therein, a spring piston carried by said hub and composed of assembled spring plates secured together independently of the hub and removable as a unit therefrom.

19. A shock absorber comprising a sector-shaped liquid-containing chamber formed of pressed sheet metal cover and body portions having flanged connection joints between the planes of their side walls whereby the peripheral wall of said chamber is rendered relatively non-yielding to internal pressures, a hub journaled in said body and cover portions, respectively, and a spring-yielding piston member oscillated by the hub and imparting shock pressures to the liquid.

20. A shock absorber comprising a liquid-confining chamber and formed of pressed sheet metal cover and body portions, both of which portions are stamped with hub-receiving bosses, the center of one of said bosses being bent inwardly to form an end bearing, a hub journaled in said bosses, an oscillating piston blade carried by the hub within the casing, and a connection arm mounted on the hub outside of the casing.

21. A shock absorber comprising a liquid-confining chamber, a hub carrying a piston member within the chamber and having a connection part extended through a hole in the wall of the casing, packing washers on opposite sides of the margin of said hole, and a connection arm on the outer end of the hub adapted to maintain the washers under pressure upon said margin.

22. A shock absorber comprising a chamber containing liquid, a hub journaled therein carrying an oscillating piston within the chamber and having a connection part extended through a hole in the wall of the chamber, in combination with a connection arm 16 formed of sheet metal folded over and welded to a filler block 21 and attached to the outer end of said hub.

23. A shock absorber comprising a chamber containing liquid, a hub journaled therein carrying an oscillating piston within the chamber and having a connection part extended through the wall thereof, a bushing non-rotatably engaged with said connection part, a connection arm embracing the periphery of the bushing, and means disposed between the adjacent wall of the chamber and the end of said connection part for securing said arm and bushing thereto.

24. A shock absorber comprising a liquid-confining chamber, a hub journaled therein carrying an oscillating piston within the casing and having a connection part extending through the wall thereof, a split bushing non-rotatably engaged to said connection part, a connection arm having a split hub part embracing the bushing and angularly adjustable with reference thereto, and clamping means for simultaneously closing said hub upon the bushing and the bushing upon the connection part of the hub.

25. A shock absorber comprising a liquid-containing chamber, a piston therein, a passage whereby the liquid may flow from one side to the other of said piston, an elastic wall for said passage adapted to yield to the liquid pressure and thereby vary the capacity of said passage and adjustable means for variably limiting the return movement of said wall.

26. In a shock absorber the combination of a casing, a body of resistance liquid therein adapted to flow from one side of the casing to the other under the effect of the shock pressure and means for imparting the pressure to cause such flow comprising two spring-yielding members respectively possessing different degrees of spring strength and operating to temporarily store the shock energy.

In testimony whereof, I have signed this specification.

RUSSELL S. CARTER.